United States Patent [19]

Fischer

[11] Patent Number: 4,763,396
[45] Date of Patent: Aug. 16, 1988

[54] METHOD AND DEVICE FOR PREVENTING CORROSION OF AN EXPANDABLE MOUNTING ELEMENT ANCHORED IN A MOUNTING HOLE

[76] Inventor: Artur Fischer, Weinhalde 34, 7244 Waldachtal 3/Tumlingen, Fed. Rep. of Germany

[21] Appl. No.: 926,404

[22] Filed: Oct. 30, 1986

[30] Foreign Application Priority Data

Nov. 2, 1985 [DE] Fed. Rep. of Germany ....... 3538995

[51] Int. Cl.⁴ ...................... B23P 25/00; E21D 20/02
[52] U.S. Cl. ...................... 29/458; 29/469.5; 29/523; 405/261; 405/303; 411/54; 411/82
[58] Field of Search ...................... 29/522 R, 523, 458, 29/469.5; 411/54, 82, 258; 52/743, 155, 165; 405/261, 303

[56] References Cited

U.S. PATENT DOCUMENTS

| Re. 25,869 | 10/1965 | Schuermann et al. | 405/261 |
|---|---|---|---|
| 3,188,815 | 6/1965 | Schuermann et al. | 405/261 |
| 3,702,060 | 11/1972 | Cumming | 405/261 |
| 3,940,941 | 3/1976 | Libert et al. | 405/261 |
| 4,185,438 | 1/1980 | Fischer | 411/82 X |
| 4,299,515 | 11/1981 | Yates | 405/261 X |
| 4,518,290 | 5/1985 | Frichmann et al. | 405/261 X |
| 4,611,954 | 9/1986 | Cassidy | 405/561 |

FOREIGN PATENT DOCUMENTS

| 7707194 | 8/1977 | Fed. Rep. of Germany . | |
| 2643774 | 3/1978 | Fed. Rep. of Germany . | |
| 2507658 | 8/1978 | Fed. Rep. of Germany . | |
| 7913376 | 10/1980 | Fed. Rep. of Germany . | |
| 2810503 | 7/1982 | Fed. Rep. of Germany . | |
| 8202679 | 2/1983 | Fed. Rep. of Germany . | |
| 1065614 | 1/1984 | U.S.S.R. | 405/261 |

Primary Examiner—Charlie T. Moon
Attorney, Agent, or Firm—Michael J. Striker

[57] ABSTRACT

A method for preventing corrosion of an expandable mounting element which involves introducing a sealing composition into a mounting hole of a support structure first to fill the hole about half-way, then driving an expandable mounting element into the half-filled hole to displace the sealing composition initially against the base of the mounting hole and then up along the surface of the expandable mounting element until the excess emerges out of the mounting hole. A compressible impact device, which has an upper and lower part and a spring part fixed therebetween, is arranged so that an impact tool can be driven against the upper part to fully drive the expandable mounting element into the mounting hole, effecting a sealing compaction in correspondance with the pressure exerted by the spring part. All gaps and cracks are thereby sealed against corrosive media.

22 Claims, 1 Drawing Sheet

METHOD AND DEVICE FOR PREVENTING CORROSION OF AN EXPANDABLE MOUNTING ELEMENT ANCHORED IN A MOUNTING HOLE

FIELD OF THE INVENTION

The present invention relates generally to a method of preventing the corrosion of an expandable mounting member anchored in a mounting hole and to a device for fulfilling this method.

BACKGROUND OF THE INVENTION

Mounting holes are known to include drilled holes in concrete which have an undercut portion at the base. Expandable mounting elements are known to have an expansion sleeve member fitted around a mounting member, such as a stay bolt or stud. An expander cone member is located at the front end of a mounting member so that the expansion sleeve member may be driven onto the expander cone member. Objects may be secured to the rear end of the mounting element so that when the mounting element is secured in the hole, the object is held firmly by the mounting element against the concrete surface around the mounting hole.

It is known that expandable mounting elements are subject to corrosion. Corrosion prevention meausures have either been directed at making the mounting elements either corrosion resistant or made from a suitable resistant material. In general, steel mounting elements are used for heavy-duty fastenings. Galvanization is used for when the requirement for corrosion resistance is relatively low. The mounting elements are made of special steel when there are higher corrosion resistance requirements.

Such protective measures are often inadequate. Moisture and other aggressive media can still penetrate the cracks and gaps in the mounting hole and the expandable mounting element, thereby attacking the concrete reinforcement and attack the individual parts of the expandable mounting element as a result of contact corrosion. The latter problem can not be avoided completely even for expandable mounting elements made of special steel, because of practical considerations and because different manufacturing processes are required for each individual part of the expandable mounting element so that different types of special steels are used.

SUMMARY OF THE INVENTION

It is the object of the present invention to provide a method and device to prevent the corrosion of expandable mounting elements, which are anchored in a mounting hole.

In keeping with this object, and others which will become apparent hereafter, one aspect of the invention resides, briefly stated, in a method of preventing corrosion of an expandable mounting element anchored in a mounting hole of a support structure, preferably for an impact expandable mounting element anchorable upon being driven into a drilled hole of a support structure having an undercut portion, the method including providing an expandable mounting element to be driven in and which has a mounting member, an expansion sleeve member around said mounting member, an expansion sleeve member around said mounting member, an expander cone member arranged so that the expansion sleeve member is drivable thereon, and an end face insertable first into a mounting hole of a support structure into which the expandable mounting member is to be anchored, the hole having a base, introducing a sealing composition into the hole, and driving the expandable mounting element into the hole after introducing the sealing composition into the hole so that the sealing composition becomes displaced by the end face of the expandable mounting element first against the base of the hole and then up along the expandable mounting element until emerging as excess from the hole.

Another aspect of the invention resides in a device for compacting a sealing composition into a mounting hole of a support structure by an expandable mounting element drivable therein, the expandable mounting element including a mounting member, an expansion sleeve member around the mounting member, an expander cone member arranged so that the expansion sleeve member is drivable thereon, and an end face insertable first into the hole, the expansion sleeve member haivng an end furthest away from the end face of said expandable mounting element, the device including a lower element pushable over the expansion sleeve member, an upper element having a flange and an end face spaced away from said flange, said end face of said upper element being buttable against the end of the expansion sleeve member and compression spring means arranged between said lower element and said flange of said upper element, said spring being supported by said flange and engaging said lower element such that said lower element is pushable by said spring to approximately a middle of the expandable sleeve when said upper element abuts against the end of the expansion sleeve and said lower element is arranged closer to said end face of said expandable mounting element than is said upper element.

It is another object of the present invention to protect both the portion of the expandable mounting element in the mounting hole and any of the conrete reinforcement that is cut into as a result from drilling a mounting hole.

It is yet another object to resolve the problem of the prior art by introducing a sealing composition, preferably of silicon, mortar, or the like, into a mounting hole by means of an injection cartridge, tube or the like. Alternatively, if the sealing composition is not pre-packaged into quantities that are suitable for individual holes, then it is recommended that the mounting hole be approximately half-filled.

It is still another object to immediately thereafter drive the expandable mounting element into mounting hole containing the sealing composition. In this manner, the sealing composiion flows from the base of the drilled hole upwards, along the surface of the expandable mounting element and towards the mouth of the mounting hole. In effect, the cracks and gaps are sealed off both between the individual parts of the plug and between the plug and the wall of the mounting hole.

It is a further object to use excess sealing composition flowing out of the mouth of the mounting hole to fill in the edge of the mounting hole, which usually crumbles during drilling. Any remainder is scraped off.

It is yet a further object to allow the sealing composition to harden in the air to form an air- and water-tight seal for the mounting hole, as well as for the expandable mounting element. This seal prevents moisture and other aggressive media from penetrating the mounting hole. In this manner, neither contact corrosion between the individual parts of the plug nor corrosion of the reinforcement rods directly around the fastening area can occur.

It is yet another object to provide a disc or ring, having an outer diameter approximately three times that of the expansion sleeve. Preferably, the disc or ring is made of synthetic resin and friction fit onto the expansion sleeve at a location approximately half-way along the length of the expansion sleeve. The disc is arranged on the expansion sleeve member to completely cover the mouth of the mounting hole, even when the mounting hole is very much broken up.

It is still another object to imrpove the filling of the mounting hole, and especially the broken-up edge of the mounting hole. When the expandable mounting element is driven in, the frictional force of the disc on the expansion sleeve member creates a corresponding pressure at the mouth of the mounting hole, which results in the compacting of the sealing composition which improves filling of the mounting hole, especially broken-up edges. Excess sealing composition is squeezed out between the edge of the disc and the outer surface of the wall and can be scraped away. The disc is held onto the mouth of the mounting hole because of the adhesion between the sealing composiion and the disc, even when the sealing composition is completely cleaned off above the expansion sleeve member. The disc can be further braced by an article which is to be held against the concrete surface.

It is an additional object to provide a compressible impact device, which has a disc-like lower part pushed onto the expansion sleeve member, an upper part with a flange member butting against the end face of the expansion sleeve member, and a compression spring part arranged between the lower part and the flange of the upper part. When the upper part is positioned onto the end face of the expansion sleeve member, the spring part pushes the lower part approximately as far as the middle of the expansion sleeve member. The block length of the lower part is smaller than the distance from the end face of the upper part to its flange supporting the compression spring part.

It is another additional object to adjust the desired degree of compaction of the sealing composition to the design of the compression spring part. When driving, the flange of the upper part is driven toward the lower part. In practice, the disc-like lower part is pressed so hard against the mouth of the mounting hole by the compression spring part during the driving-in operation that optimum filling of the mounting hole, cracks and masonry pores is achieved.

It is a further additional object to simplify the handling of the device by using an impact tool, which has a handle that can be placed on the upper part, to apply an impact force against the expansion sleeve member by way of the upper part of sufficient magnitude to anchor the expandable mounting element such as an impact expandable plug.

It is yet a further object to protect the lower part against contamination from excess sealing composition, which emerges from beneath the synthetic resin disc or ring mentioned previously. This object is accomplished by providing the disc-like lower part with a diameter somewhat smaller than that of the disc or ring. Preferably, the lower part is made from synthetic resin and also placed onto the expansion sleeve member.

It is still another object to provide both the lower part and the flange of the upper part with a respective cylindrical portion engagable with and holding the opposite ends of the compression spring part. The compression spring part holds the parts of the compressible impact device together by sitting firmly on these cylindrical portions, and optionally, also engaging a circumferential groove in each portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
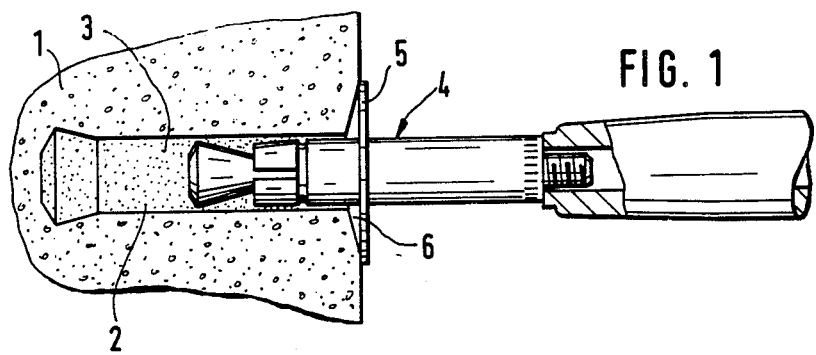
FIG. 1 is a plan view of the present invention in which a mounting hole or drilled hole is shown filled with sealing composition and an impact expandable mounting member is shown prior to impact.

Referring now to the drawings, FIG. 1 shows a sealing composition 3, for example silicon, synthetic resin, or mortar. The sealing composition 3 is introduced by means of an injection cartridge, tube, or the like (not shown) into a mounting hole 2, which has been prepared in a solid building material 1, such as concrete, for an expandable mounting element 4.

The expandable mounting element 4 is then driven into the mounting hole 2, which has been filled approximately half-way with sealing composition 3. This driving forces the sealing composition to displace up along the surface of the expandable mounting element 4 from the base of the mounting hole 2.

A synthetic resin disc 5 is fitted onto the expansion sleeve member in a frictional manner until it comes to rest against the mouth 6 of the mounting hole 2 to cover it 6 completely, including any broken edges or portions.

As the sealing composition 3 rises upward along the surface of the expandable mounting element 4 from the base of the mounting hole 2 as the expandable mounting element 4 penetrates deeper into the mounting hole 2, all of the cracks and gaps are sealed off. The mounting hole 2 becomes completely filled with the sealing composition 3 because of the disc 5 covering the mouth 6 of the mounting hole 2. Any excess sealing composition 3 is squeezed out between the edge of the disc 5 an the outer surface of the wall and can be scraped off.

Figure 2:
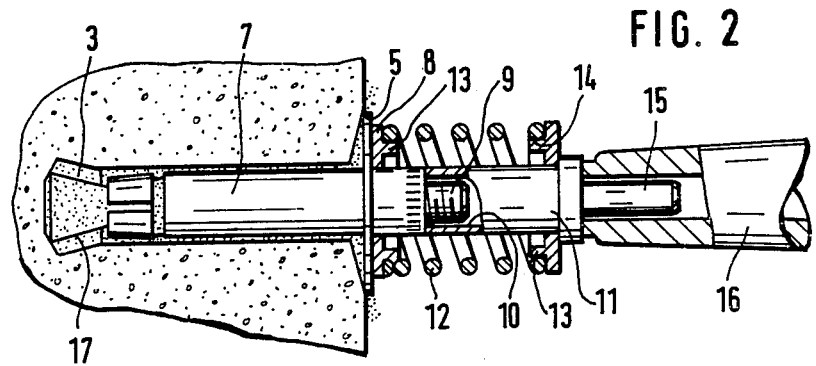
FIG. 2 is a plan view of the present invention in which an impact expandable mounting member is being anchored into the filled hole of FIG. 1 by using a compressible impact device of the present invention and an impact tool.
Figure 3:
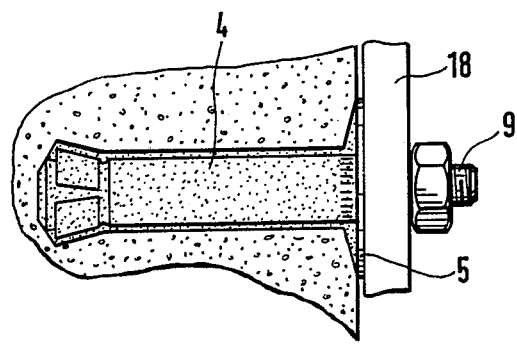
FIG. 3 is a plan view of an impact expandable mounting member securing an article in a mounting hole and protected against corrosion.

FIG. 2 depicts an compressible impact device to both anchor the expandable mounting element 4 and compact the sealing composition 3 to improve the filling of the mounting hole 2. The device has a disc-like lower part 8, which is pushed over the expansion sleeve member 7; and upper part 11, which has a suitable inside bore 10 for accomodating themountign member 9 and which butts against the end face of the expansion sleeve member 7; and a compression spring part 12, which is arranged between the upper 11 and lower parts 8.

Both the upper 11 and lower 8 parts have a cylindrical portion 13, to which the compression spring part 12 is fixed. If desired, an annular groove 14 can be used for this fixing as well. The disc-like lower part 8 comes to rest on the outer surface of the building mateial 1 when the expandable mounting element has been pushed into the prepared mounting hole 2, which has been partially pre-filled with sealing composition 3.

Placing an impact tool 16 on a corresponding portion 15 of the upper part 11, the expandable mounting element 4 can be driven fully into the mounting hole 2 by using the impact tool 16. At the same time, the expansion sleeve member is driven onto the expander cone member 17 of the mounting member 9.

During this procedure, the compression spring part 12 presses the lower part 8 firmly onto the mouth 6 of the mounting hole 2. Thereby, the sealing composition 3 rising from the base of the mounting hole 2 is compacted in the mounting hole 2 in accordance with the pressure exerted by the compression spring part 12. In this manner, optimal filling of the mounting hole 2 is achieved with all the gaps and cracks sealed.

A thin-walled synthetic resin disc 5 is arranged under the lower part 8 to protect the lower part 8 against contamination and to allow the compressible impact device to be removed without difficulty after the mounting hole 2 has been filled.

A portion of the expandable mounting element is located in the mounting hole 2, becoming completely encased by the sealing composition 3. Thus, no moisture can penetrate the mounting hole 2. A desired object 18 is then secured to the portion of the mounting member 9 of the expandable mounting element 4 which projects out of the mounting hole 2. Once secured, the object 18 also braces the synthetic resin disc 5 covering the mouth of the mounting hole 2.

It will be understood that each of the elements described above, or two or more together, may also find a useful application in other types of methods and devices to prevent corrosion of expandable mounting elements differing from the types described above.

While the invention has been illustrated and described as embodied in a method and device to prevent corrosion of an expandable mounting element, it is not intended to be limited to the details shown, since varous modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A method of preventing corrosion of an expandable mounting element anchored in a mounting hole of a support structure, the hole having a base, the method comprising:
   introducing a sealing composition into the mounting hole of the support structure;
   mounting a disc on an expansion sleeve of an expandable mounting element, the expandable mounting element also having a mounting member around which is the expansion sleeve member, and an expander cone member with an end face, the expander cone member extending longitudinally forward of the mounting member and being arranged so that said expansion sleeve member is drivable thereon;
   inserting the expandable mounting element into the sealing composition from the end face to the disc so that the disc can rest on a surface of the support structure, the disc being mounted on the expansion sleeve member so that the expandable mounting element is drivable relative to the disc; and
   preventing corrosion of the expandable mounting element and including compacting the introduced sealing composition by first driving the expandable mounting element, including the expander cone member and the expansion sleeve member, further into the introduced sealing composition and thereby further into the hole and relative to the disc so that the sealing composition displaces by the end face of the expander cone member first against the base of the hole and then up along the expandable mounting element until reaching the disc against which the sealing composition compacts and an excess of the sealing composition emerges from the hole by squeezing out between the disc and the surface of the support structure.

2. The method as defined in claim 1, wherein the mounting includes:
   the disc onto the expansion sleeve member at approximately half-way therealong before the driving, the disc having a diameter approximately three times that of the expansion sleeve member and being friction fit onto the expansion sleeve member.

3. The method as defined in claim 2, wherein the placing includes making the disc preferably out of synethetic resin.

4. The method as defined in claim 2, further comprising:
   securing an article to the mounting member such that the article also braces the disc.

5. The method as defined in claim 1, further comprising:
   using a portion of the excess sealing composition emerging from the hole for filling in any crumbled portion of the hole which occurred during the making of the hole; and
   scraping off any remaining excess.

6. The method as defined in claim 1, wherein the mounting further includes mounting a lower element on the expandable sleeve and mounting a spring element between the lower element and the disc and so that the spring element engages the lower element, the driving including driving against the spring element so that the spring element coacts with the disc and the lower element to cause the sealing composition to compact in correspondance with a pressure exerted by the spring.

7. The method as defined in claim 6, wherein the mounting further includes providing an upper element to butt against an end face of the expansion sleeve member and to thereby press against the spring element so that the lower element is pushed to approximately the middle of the expansion sleeve member by the spring element, the driving including striking against the upper element, said upper element being arranged so that when the upper element is stricken, the expandable plug is thereby driven fully into the hole and simultaneously the expansion sleeve member is driven onto the expamder cone member.

8. The method as defined in claim 1, wherein the introducing includes making the sealing composition from a material selected from a group consisting of silicon, synthetic resin and mortar.

9. The method as defined in claim 1, wherein the driving further includes driving the expansion sleeve member onto the expander cone member while driving the expandable mounting element further into the introduced sealing composition.

10. The method as defined in claim 1, wherein the inserting includes friction fitting the disc onto the expansion sleeve member.

11. An arrangement for preventing corrosion of an expandable mounting element anchored in a mounting heel of a support structure, the arrangement comprising:
   an expandable mounting element having a mounting member, an expansion sleeve member around said mounting member, and an expander cone member arranged so that said expansion sleeve member is drivable thereon, said expander cone extending longitudinally forward of said mounting member and having an end face insertable first into the hole, said expansion sleeve member having an end facing outward away from said end face of said expander cone member;
   means for preventing corrosion of said expandable mounting element and including a disc mounted on said expansion sleeve member so that said expandable mounting element is drivable relative to said disc, said expandable mounting element being insertable in a sealing composition from said end face of said expander cone up to said disc so that said disc can rest on a surface of the supporting structure, said disc being formed so that when the sealing composition displaces to said disc, said sealing composition compacts against said disc and thereby prevents corrosion of said expandable mounting element; and
   means for driving said expandable mounting element, including said expander cone member and said expansion sleeve member, further into the sealing composition and relative to said disc so as to displace the sealing composition first by said end face of said expander cone member and then along said expandable mounting element until reaching said disc against which the sealing composition compacts and an excess of the sealing composition emerges by squeezing between said disc and the surface of the support structure.

12. The arrangement as defined in claim 11, further comprising a disc around the expansion sleeve member at approximately half-way therealong, said disc having a diameter approximately three times that of the expansion sleeve member, said disc being friction fit onto the expansion sleeve member.

13. The arrangement as defined in claim 12, wherein the disc is preferably composed of synthetic resin.

14. The arrangement as defined in claim 11, wherein said driving means is formed so as to drive said expansion sleeve member onto said expander cone while driving said expandable mounting element further into the sealing composition.

15. The method as defined in claim 11, wherein said disc is friction fit onto said sleeve member.

16. The arrangement as defined in claim 9, further comprising the sealing composition.

17. The arrangement as defined in claim 11, wherein said means for preventing corrosion further includes a lower element, and an upper element having a flange and an end face spaced away from said flange, said end face of said upper element being in abutment against said end of said expansion sleeve member, said preventing means also including compression spring means arranged between said lower element and said flange of said upper element, said compression spring means being supported by said flange and engaging said lower element such that said lower element is pushable by said spring to approximately a middle of the expandable sleeve and said lower element is arranged closer to said end face of said expandable mounting element than is said upper element.

18. The arrangement as defined in claim 17, wherein said lower element has a block length, said upper element having a distance between said end face of said upper element and said flange, said upper and lower elements being formed and arranged so that said block length is shorter than said distance.

19. The arrangement as defined in claim 18, wherein said upper part is formed to accomodate an impact tool.

20. The arangment as defined in claim 17, wherein said lower element has a disc-like shape and has a diameter smaller than that of said disc.

21. The arrangement as defined in claim 17, wherein said lower element is preferably composed of synthetic resin.

22. The arrangement as defined in claim 17, wherein said lower element and said upper element each have a cylindrical portion engaging said compression spring means.

* * * * *